July 9, 1957  B. J. WARMAN  2,798,983
CHAIN CIRCUITS SUCH AS ARE USED FOR COUNTING, STORAGE, AND
LIKE PURPOSES IN AUTOMATIC EXCHANGE SYSTEMS
Filed Nov. 5, 1956  5 Sheets-Sheet 1

United States Patent Office

2,798,983
Patented July 9, 1957

2,798,983

CHAIN CIRCUITS SUCH AS ARE USED FOR COUNTING, STORAGE, AND LIKE PURPOSES IN AUTOMATIC EXCHANGE SYSTEMS

Bloomfield James Warman, Charlton, London, England, assignor to Siemens Brothers & Co. Limited, London, England, a British company Application November 5, 1956, Serial No. 620,502

Claims priority, application Great Britain November 4, 1955

12 Claims. (Cl. 315—84.5)

This invention relates to chain circuits such as are used for counting, storage, and like purposes in automatic exchange systems, and relates more particularly to chain circuits of this character using trigger devices of the kind having a voltage/current characteristic, in respect to voltage appearing across and current flowing between two terminals, which exhibits a negative resistance region. Hereinafter, the expression "two-terminal trigger device" will be used to mean a trigger device of the kind referred to, which may for example be a gas discharge tube or a transistor or the like.

According to the invention, there is provided a chain circuit, comprising a plurality of identical link circuits each of which includes an input capacitor and a two-terminal trigger device, wherein the input capacitor in each link circuit is connected, directly or indirectly, to one terminal (the first terminal) of the two-terminal trigger device of the link circuit and, if the link circuit is other than the first in an unclosed chain, to the other terminal (the second terminal) of the two-terminal trigger device of the immediately preceding link circuit of the chain, and wherein a link circuit is brought to a marking condition by the establishment of a charge upon its input capacitor, and wherein the marking condition is transferred from a link circuit to an immediately adjacent link circuit as a consequence of the application of a transfer voltage, effectively in series with the charged input capacitor of the first of the two link circuits, to bring about the triggering of the two-terminal trigger device of one of the two link circuits and the consequent flow through this trigger device of a current sufficing to bring the second of the two link circuits to the marking condition, and wherein biasing and/or unidirectional conducting means are provided to ensure that transfer of the marking condition in response to the application of a transfer voltage takes place in the desired direction along the chain.

Chain circuits arranged in accordance with the present invention may be of either of two types. In one of these types, the trigger device of a link circuit is in its triggered condition only during the actual transfer of the marking condition by current flow through this device, and the transfer of the marking condition from one link circuit to another consists essentially in transferring the charge existing upon the input capacitor of the one link circuit to the input capacitor of the other. Chain circuits of this type are preferably arranged to operate cyclically, in order to avoid having to leave a charge upon any capacitor long enough for the magnitude of the charge to be seriously affected by leakage, and find especially advantageous applications in connection with the so-called "reiterative" method of storing information.

In the other of the two types of chain circuit referred to, the trigger device of a link circuit is not only in its triggered condition during the actual transfer of the marking condition which takes place when the device is triggered, but remains in its triggered condition pending further transfer, the link circuits being arranged so that, in general, upon the initiation of transfer from one link circuit to an immediately adjacent link circuit, the previously triggered trigger device of the other immediately adjacent link circuit is restored to normal. In chain circuits of this type, the charge initially applied to the input capacitor of a link circuit upon transfer of the marking condition to this link circuit is maintained, pending transfer of the marking condition from this link circuit, by current flow through the trigger device of an immediately adjacent link circuit. Consequently, chain circuits of this type find especially advantageous applications in connection with the so-called "static" method of storing information (i. e. the method in which information may be stored indefinitely in the same storage position of a static storage circuit).

The features of the invention are exemplified in the various chain circuits in accordance with it which will now be described with reference to the accompanying drawings.

Fig. 7 is a circuit diagram illustrating a chain circuit in which a plurality of link circuits are connected to form an unclosed chain which functions like a delay line. The chain circuits of Figs. 1 to 7 inclusive are of the first of the two types which have been referred to.

Figure 1:
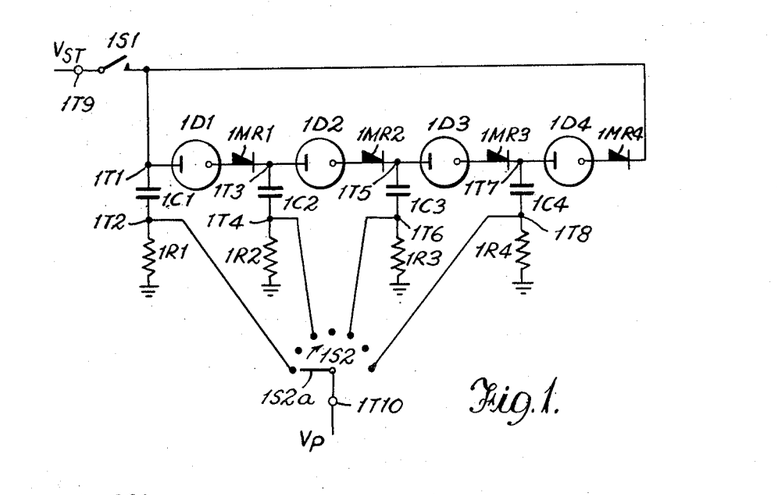
Fig. 1 of the drawings is a circuit diagram illustrating a chain circuit in which each link circuit comprises an input capacitor, a cold-cathode gas-filled diode, a dry-plate or crystal rectifier, and a charging resistor, and in which the link circuits are connected to form a closed chain or ring constituting a ring counter.

Referring firstly to Fig. 1, the chain circuit to which this figure pertains is shown as comprising four link circuits, but it will be appreciated by those skilled in the art that the actual number of link circuits shown in this figure, and indeed in each figure of the drawings, is purely exemplary. As previously stated, the link circuits are connected to form a closed chain or ring constituting a ring counter, and the chain circuit is of the first of the two types which have been referred to. Each link circuit comprises an input capacitor 1C1, 1C2, 1C3, or 1C4, a cold-cathode gas-filled diode 1D1, 1D2, 1D3, or 1D4, a dry-plate or crystal rectifier 1MR1, 1MR2, 1MR3, or 1MR4, and a charging resistor 1R1, 1R2, 1R3, or 1R4. All the input capacitors have the same capacity, and all the gas-filled diodes have similar characteristics. The gas-filled diode and the rectifier of each link circuit are connected in series between one terminal (hereinafter termed the first terminal) of the input capacitor of the link circuit and the corresponding (first) terminal of the input capacitor of the next succeeding link circuit in the closed chain, the diode being connected with its anode towards the first-mentioned terminal and the rectifier being connected with its positive terminal towards the second-mentioned terminal (i. e. being connected to present low resistance to flow of current from the first-mentioned terminal to the second-mentioned terminal. In the figure, the so-called first terminals of the input capacitors of the link circuits are designated 1T1, 1T3, 1T5, and 1T7, and the second terminals of these capacitors are designated 1T2, 1T4, 1T6, and 1T8. The charging resistor of a link circuit is connected between the second terminal of the input capacitor of the link circuit and earth. The first terminal 1T1 of the input capacitor 1C1 of one particular link circuit in the closed chain (hereinafter termed the first link circuit in the chain) is connected so that a positive storage voltage $V_{ST}$ can be applied to it for a brief period to charge the capacitor to this voltage, thereby bringing the link circuit to the marking condition. The means shown in the figure for thus applying a positive storage voltage is purely exemplary and comprises a "make" contact 1S1 connected between terminal 1T1 and a terminal 1T9 which is connected to a source of the positive storage voltage $V_{ST}$. The second termnials 1T2, 1T4, 1T6, and 1T8 of the input capacitors of the link circuits are connected so that during counting positive transfer pulses of a voltage $V_P$ are applied to these terminals in turn. The means shown in the figure for thus applying positive transfer pulses is purely exemplary and comprises a rotary switch 1S2 having its wiper 1S2$a$ connected to a terminal 1T10 which during counting is connected to a source of the positive transfer pulse voltage $V_P$. When switch 1S2 is in operation, its wiper 1S2$a$ is driven in the direction indicated by the arrow. The values of $V_{ST}$ and $V_P$ are made such that $V_{ST}$ is less than the striking voltage of the gas-filled diodes, that $V_{ST}+V_P$ is greater than this striking voltage, and that $V_P$ is equal to $V_{ST}+V_M$, where $V_M$ is the nominal maintaining voltage of the diodes. Assuming perfect components and perfect transfer of charge between capacitors, the operation of the chain circuit (ring counter) just described is as follows. When, after the positive storage voltage has been applied for a brief period to the first terminal 1T1 of the input capacitor 1C1 of the first link circuit in the chain to charge this capacitor to the voltage $V_{ST}$, a positive transfer pulse of voltage $V_P$ is applied to the second terminal 1T2 of this capacitor, then the voltage across the gas-filled diode 1D1 of the first link circuit becomes $V_{ST}+V_P$. Since $V_{ST}+V_P$ is greater than the striking voltage, the gas-filled diode 1D1 strikes and current flows through it from the input capacitor 1C1 of the first link circuit in the chain to the input capacitor 1C2 of the scond link circuit in the chain. In the idealised case now being taken, upon the striking of the gas-filled diode 1D1 the voltage across it becomes the maintaining voltage $V_M$ and remains at this value until the diode extinguishes. The length of the transfer pulses is such that the transfer pulse concerned lasts until after the diode extinguishes. Since all the capacitors have the same capacity, the rise of voltage across the input capacitor 1C2 of the second link circuit in the chain equals the fall of voltage across the input capacitor 1C1 of the first link circuit in the chain. The diode 1D1 extinguishes when no voltage in excess of $V_M$ exists to maintain current flow through it. Hence, if $V_1$ denotes the voltage across the input capacitor 1C1 of the first link circuit in the chain immediately subsequent to the extinguishing of this diode, and $V_2$ denotes the voltage across the input capacitor 1C2 of the second link circuit in the chain at this time, we have—

$$V_M = V_P + V_1 - V_2 = (V_{ST}+V_M) + (V_{ST}-V_2) - V_2$$

or $$V_2 = V_{ST} \text{ and } V_1 = 0$$

Thus the application of the transfer pulse to the second terminal 1T2 of the input capacitor 1C1 of the first link circuit in the chain causes the charge stored on this capacitor to be transferred to the input capacitor 1C2 of the second link circuit in the chain. In a corresponding manner, when, shortly after the termination of the transfer pulse just mentioned, a transfer pulse is applied ot the second terminal 1T4 of the input capacitor 1C2 of the second link circuit in the chain, then this pulse causes the charge stored on this capacitor to be transferred to the input capacitor 1C3 of the third link circuit in the chain, and so on. The rectifier 1MR1, 1MR2, 1MR3, or 1MR4 of a link circuit serves to prevent the associated gas-filled diode from striking, out of turn, with the electrode which it is desired should be the anode serving as the cathode.

With a chain circuit according to the invention of this nature, there is an inherent regulating action which tends, when the stored charge is repeatedly circulated around the closed chain, to maintain the stored charge at its nominal value in spite of leakage to or from the input capacitors or deviations of the maintaining voltages of the gas-filled diodes from the nominal value. Broadly, this regulating action occurs owing to the fact that the transfer pulse voltage $V_P$ is definitely related to the nominal value $V_{ST}$ of the voltage across the input capacitor of a link circuit in the marking condition and to the nominal value $V_M$ of the maintaining voltage of the gas-filled diodes. If, for example, the maintaining voltage of the gas-filled diode 1D1 of the first link circuit in the chain is $V_M+d$ instead of $V_M$, then the equations of the immediately preceding paragraph become—

$$V_M+d = V_P + V_1 - V_2 = (V_{ST}+V_M) + (V_{ST}-V_2) - V_2$$

or $$V_2 = V_{ST}-0.5d \text{ and } V_1 = 0.5d$$

Continuing with the same example, and assuming that the maintaining voltage of the gas-filled diode 1D2 of the second link circuit in the chain has the nominal value $V_M$, and considering the tranfer of the stored charge from the input capacitor 1C2 of this link circuit to the input capacitor 1C3 of the third link circuit in the chain, then if $V_2^1$ denotes the voltage across the input capacitor 1C2 of the second link circuit subsequent to the extinguishing of the gas-filled diode 1D2 of this link circuit, and $V_3$ denotes the voltage across the input capacitor 1C3 of the third link circuit at this time, the equations for this transfer are—

$$V_M = V_P + V_2^1 - V_3 = (V_{ST}+V_M) \\ + (V_{ST}-0.5d-V_3) - V_3$$

or $$V_3 = V_{ST}-0.25d \text{ and } V_2^1 = -0.25d$$

Thus in a single transfer the effect of the deviation from nominal has been halved, which clearly exemplifies the inherent regulating action of the chain so far as deviations of the maintaining voltages of the gas-filled diodes from nominal are concerned.

Assuming, by way of further example, that owing to leakage or other causes the voltages across the input capacitors 1C1 and 1C2 of the first and second link circuits in the chain just prior to transfer between these capacitors are $V_{ST}-d_1$ and $-d_2$ respectively (instead of $V_{ST}$ and zero respectively), then the equations for this transfer are—

$$V_M = V_P + V_1 - V_2 = (V_{ST} + V_M)$$
$$+ (V_{ST} - d_1 - V_2 - d_2) - V_2$$

or and
$$V_2 = V_{ST} - 0.5d_1 - 0.5d_2$$

$$V_1 = -0.5d_1 - 0.5d_2$$

Continuing with the same example, and considering the transfer of the stored charge from the input capacitor 1C2 of the second link circuit to the input capacitor 1C3 of the third link circuit, and assuming that the voltage across the input capacitor 1C3 of the third link circuit just prior to such transfer is zero, then the equations for this transfer are—

$$V_M = V_P + V_2{}^1 - V_3 = (V_{ST} + V_M)$$
$$+ (V_{ST} - 0.5d_1 - 0.5d_2 - V_3) - V_3$$

or and
$$V_3 = V_{ST} - 0.25d_1 - 0.25d_2$$

$$V_2{}^1 = -0.25d_1 - 0.25d_2$$

Thus in a single transfer the effect of the deviations from nominal has been halved, which clearly exemplifies the inherent regulating action of the chain so far as deviations of the voltages across the input capacitors from the nominal values ($V_{ST}$ and zero) are concerned.

Where various deviations from nominal occur and a large number of transfers is involved the analysis of the regulating action becomes very complex, but it has been found that in practice a stored charge (marking condition) can be made to circulate round the closed chain indefinitely without any substantial departure of the charge from its nominal value represented by the voltage $V_{ST}$.

Figure 2:
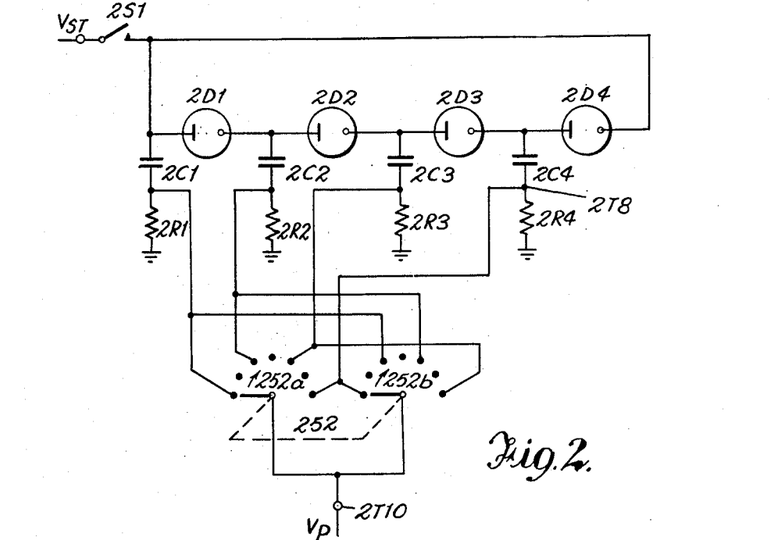
Fig. 2 illustrates a modification of the chain circuit of Fig. 1 in which the dry-plate or crystal rectifiers are omitted.

Referring now to Fig. 2, this illustrates a chain circuit which is similar to that of Fig. 1 except that the rectifiers are omitted (the gas-filled diode of each link circuit being connected directly between the first terminal of the input capacitor of the link circuit and the first terminal of the input capacitor of the next succeeding link circuit), and except that the first transfer pulse of a cycle is applied to the second terminals of the input capacitors of both the first and last link circuits in the closed chain, the second transfer pulse of a cycle is applied to the second terminals of the input capacitors of both the second and first link circuits in the chain, and so on. The circuit elements 2S1, 2D1, 2D2, 2D3, 2D4, 2C1, 2C2, 2C3, 2C4, 2R1, 2R2, 2R3, and 2R4 correspond respectively to the elements 1S1, 1D1, 1D2, 1D3, 1D4, 1C1, 1C2, 1C3, 1C4, 1R1, 1R2, 1R3, and 1R4 of Fig. 1. The means shown in the figure for applying positive transfer pulses to pairs of input capacitor terminals in the way stated is purely exemplary and comprises a rotary switch 2S2 having its wipers 2S2a and 2S2b connected to a terminal 2T10 which during counting is connected to a source of the positive transfer pulse voltage $V_P$. When switch 2S2 is in operation, its wipers 2S2a and 2S2b are driven in the direction indicated by the arrows. The application of the transfer pulses to pairs of terminals in the way stated renders the rectifiers unnecessary. For example, when transfer of a stored charge from the input capacitor 2C1 of the first link circuit to the input capacitor 2C2 of the second link circuit in the closed chain takes place in response to the first transfer pulse of a cycle, the application of the transfer pulse to the second terminal 2T8 of the input capacitor 2C4 of the last link circuit in the chain serves to prevent the gas-filled diode 2D4 of the last link circuit from striking, out of turn, with the electrode which it is desired should be the anode serving as the cathode.

Figure 3:
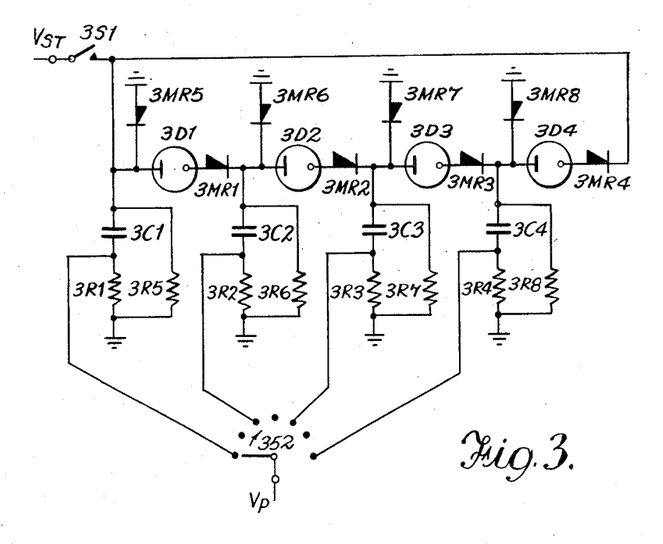
Fig. 3 illustrates a modification of the chain circuit of Fig. 1 in which each link circuit comprises additional elements which serve to render it possible readily to design the chain circuit to maintain the value of a circulated stored charge within close limits.

Referring now to Fig. 3, this illustrates a chain circuit which is similar to that of Fig. 1 except that each link circuit has a further rectifier 3MR5, 3MR6, 3MR7, or 3MR8 pertaining to it and connected in such sense between the first terminal of the input capacitor of the link circuit and earth that it conducts to prevent this terminal from becoming negative with respect to earth, and except that each link circuit has a further resistor 3R5, 3R6, 3R7, or 3R8 pertaining to it. The circuit elements 3S1, 3S2, 3D1, 3D2, 3D3, 3D4, 3C1, 3C2, 3C3, 3C4, 3MR1, 3MR2, 3MR3, 3MR4, 3R1, 3R2, 3R3, and 3R4 correspond respectively to the elements 1S1, 1S2, 1D1, 1D2, 1D3, 1D4, 1C1, 1C2, 1C3, 1C4, 1MR1, 1MR2, 1MR3, 1MR4, 1R1, 1R2, 1R3, and 1R4 of Fig. 1. The constants of the circuit are made such that, upon transfer of a stored charge from the input capacitor of any link circuit in the chain to the input capacitor of the next succeeding link circuit, the voltage of the first terminal of the input capacitor of the earlier link circuit would always be left negative were it not for the action of the clamping rectifier 3MR5, 3MR6, 3MR7, or 3MR8 of this earlier link circuit. In order to facilitate the obtaining of this result, each input capacitor is shunted (in effect) by a leak resistor 3R5, 3R6, 3R7, or 3R8 of definite resistance, but such provision of leak resistors is not essential in all cases. The clamping provided by the clamping rectifier 3MR5, 3MR6, 3MR7, and 3MR8 renders it possible readily to design the circuit to maintain the value of a circulated stored charge within close limits. In suitable cases this form of circuit may be modified by reducing the number of clamping rectifiers, only one or some of the link circuits being provided with such a rectifier.

Figure 4:
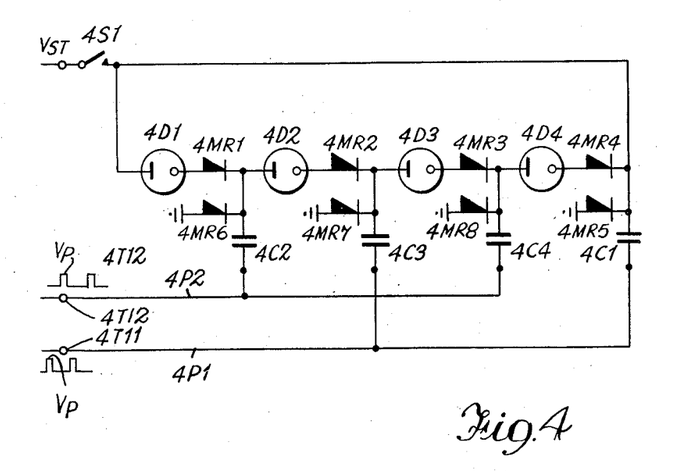
Fig. 4 illustrates a modification of the chain circuit of Fig. 1 in which pulses on two common pulse supply lines serve to bring about the circulation of a stored charge around the chain.

Referring now to Fig. 4, this illustrates a chain circuit which is similar to that of Fig. 1 except for the connections to the second terminals of the input capacitors and except that clamping rectifiers 4MR5, 4MR6, 4MR7, and 4MR8 are provided. In the case of this form of chain circuit the number of link circuits must be an even number. The circuit elements 4S1, 4D1, 4D2, 4D3, 4D4, 4C1, 4C2, 4C3, 4C4, 4MR1, 4MR2, 4MR3, and 4MR4 correspond respectively to the elements 1S1, 1D1, 1D2, 1D3, 1D4, 1C1, 1C2, 1C3, 1C4, 1MR1, 1MR2, 1MR3, and 1MR4 of Fig. 1. The second terminals of the input capacitors of the odd-numbered link circuits are connected to a first common pulse supply line 4P1 and the second terminals of the input capacitors of the even-numbered link circuits are connected to a second common pulse supply line 4P2. During counting, the common pulse supply lines 4P1 and 4P2 are connected, by way of pulse supply terminals 4T11 and 4T12 respectively, to pulse sources which are such that the potential of each pulse supply line is periodically raised from, and then lowered to, earth to constitute a positive transfer pulse of the voltage $V_P$, the transfer pulses on one line lying in the intervals between the transfer pulses on the other.

In the chain circuits according to the invention which have so far been described, each transfer pulse is a positive pulse. The invention may, however, alternatively (and in some cases with advantage) be carried out using negative transfer pulses, each such pulse operating as it were to "pull" a stored charge to the input capacitor of the link circuit to which the pulse is applied.

Figure 5:
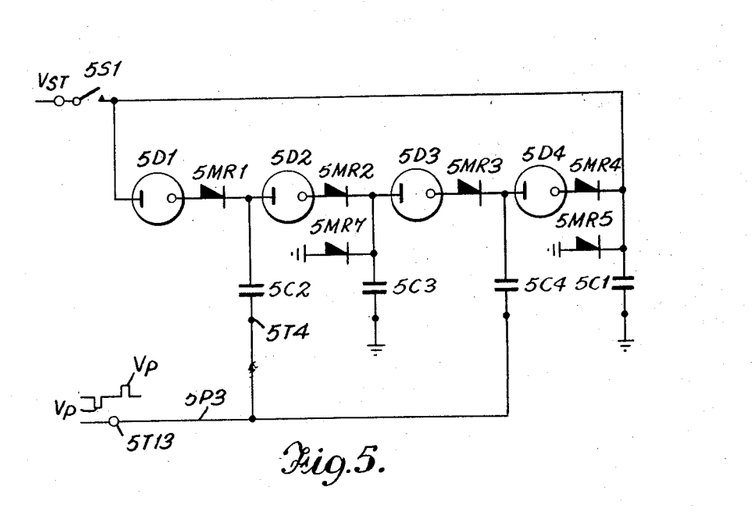
Fig. 5 illustrates a modification of the chain circuit of Fig. 1 in which pulses on a single common pulse supply line serve to bring about the circulation of a stored charge around the chain.

Referring now to Fig. 5, this illustrates a chain circuit which is similar to that of Fig. 1 except for the connections to the second terminals of the input capacitors and except that two clamping rectifiers 5MR5 and 5MR7 are provided. In the case of this form of chain circuit, the number of link circuits must be an even number. The circuit elements 5S1, 5D1, 5D2, 5D3, 5D4, 5C1, 5C2, 5C3, 5C4, 5MR1, 5MR2, 5MR3, and 5MR4 correspond respectively to the elements 1S1, 1D1, 1D2, 1D3, 1D4, 1C1, 1C2, 1C3, 1C4, 1MR1, 1MR2, 1MR3, and 1MR4 of Fig. 1. The second terminals of the input capacitors of the odd-numbered link circuits are connected to earth, and the second terminals of the input capacitors of the even-numbered link circuits are connected to a common pulse supply line 5P3. During counting, the common pulse supply line 5P3 is connected, by way of pulse supply terminal 5T13, to a pulse source which is such that periodically the potential of the pulse supply line is lowered from, and then raised to, earth to constitute a negative transfer pulse of magnitude $V_P$ and subsequently raised from, and then lowered to, earth to constitute a positive transfer pulse of the voltage $V_P$. The positive and negative transfer pulses may be quite separate, or a pair of pulses may be constituted by a composite negative-positive excursion such as may be generated by clipping a differentiated square wave. Transfer of a stored charge from the input capacitor 5C1 of the first link circuit in the chain to the input capacitor 5C2 of the second link circuit in the chain results from the appearance of a negative transfer pulse at the second terminal 5T4 of the last-mentioned capacitor, transfer of a stored charge from the input capacitor 5C2 of the second link circuit to the input capacitor 5C3 of the third link circuit results from the appearance of a positive transfer pulse at the second terminal 5T4 of the input capacitor 5C2 of the second link circuit, and so on.

Although so far reference has only been made to a positive storage voltage, the invention may equally well be carried out using a negative storage voltage, it being of course in this case necessary to connect in appropriate senses all rectifiers employed and, if they are asymmetrical, all gas-filled diodes employed.

The specific chain circuits already described in language primarily directed to the use of these circuits as ring counters may be employed as pattern registers or like information stores by arranging that information is registered on a chain by bringing to the marking condition a combination (corresponding to the information) of the link circuits of a set consisting of alternate link circuits of the chain, each cycle of transfer pulses then serving to move the "pattern" of link circuits in the marking condition one step around the chain. Chain circuits according to the invention may, however, be arranged and operated so that information is registered on a chain by bringing to the marking condition a combination of the link circuits of a set consisting of consecutive link circuits of the chain, as will now be made clear.

Figure 6:
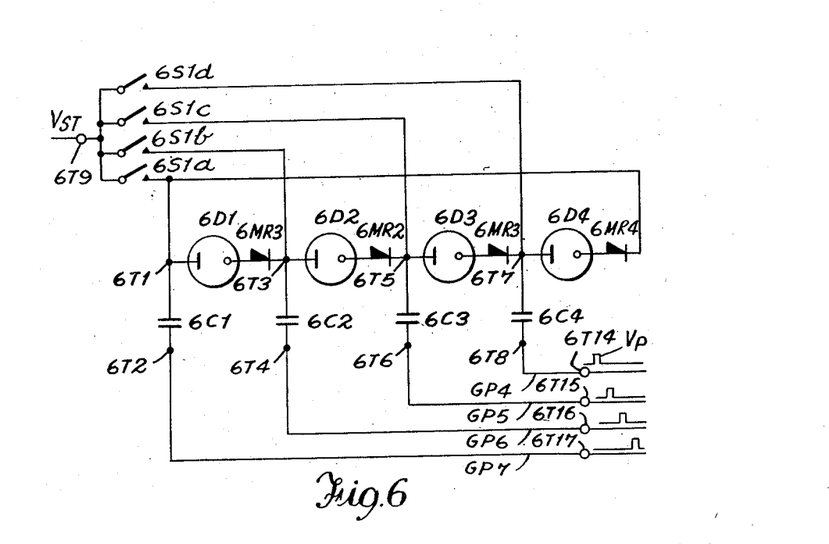
Fig. 6 is a circuit diagram illustrating a chain circuit in which each link circuit comprises an input capacitor, a cold-cathode gas-filled diode, and a dry-plate or crystal rectifier, and in which the link circuits are connected to form a closed chain or ring constituting a pattern register or like information store.

Referring now to Fig. 6, this illustrates a chain circuit in which a plurality of link circuits are connected to form a closed chain or ring constituting a pattern register or like information store. The chain circuit is of the first of the two types which have been referred to. Each link circuit comprises an input capacitor 6C1, 6C2, 6C3, or 6C4, a cold-cathode gas-filled diode 6D1, 6D2, 6D3, or 6D4, and a dry-plate or crystal rectifier 6MR1, 6MR2, 6MR3, or 6MR4. All the input capacitors have the same capacity, and all the diodes have similar characteristics. The gas-filled diode and the rectifier of each link circuit are so connected in series between one terminal (hereinafter termed the first terminal) of the input capacitor of the link circuit and the corresponding (first) terminal of the input capacitor of the next succeeding link circuit in the chain as to provide for the transfer of a positive stored charge to the last-mentioned capacitor. In the figure, the so-called first terminals of the input capacitors of the link circuits are designated 6T1, 6T3, 6T5, and 6T7, and the second terminals of these capacitors are designated 6T2, 6T4, 6T6, and 6T8. The said second terminals 6T2, 6T4, 6T6, and 6T8 are connected to pulse supply lines 6P7, 6P6, 6P5, and 6P4 respectively. For the circulation of a set "pattern" around the closed chain, the pulse supply lines 6P4, 6P5, 6P6, and 6P7 are connected, by way of pulse supply terminals 6T14, 6T15, 6T16, and 6T17 respectively, to pulse sources which are such that the potential of each pulse supply line is periodically raised from, and then lowered to, earth to constitute a positive transfer pulse of the voltage $V_P$, the transfer pulses on the different pulse supply lines being spaced so that transfer pulses are applied to the link circuits in turn in the order last link circuit in the chain, last but one link circuit in the chain, and so on. With this form of pattern register, the number of signal elements composing a pattern must be at least one less than the number of link circuits. Thus in the specific chain circuit illustrated the number of signal elements composing a pattern must be three or less. To explain the operation, the specific case where a three-element pattern is involved will be taken. The means shown in the figure for initially registering a signal pattern on the link circuits in the chain is purely exemplary and comprises four "make" contacts which can be operated independently. These contacts are contact 6S1a connected between terminal 6T1 and a terminal 6T9 which is connected to a source of the positive storage voltage $V_{ST}$, a contact 6S1b connected between terminal 6T3 and terminal 6T9, a contact 6S1c connected between terminal 6T5 and terminal 6T9, and a contact 6S1d connected between terminal 6T7 and terminal 6T9. Suppose that a signal pattern, comprising for example three consecutive marking conditions, is initially registered on the first, second, and third link circuits in the chain by the application, by the operation of contacts 6S1a, 6S1b, and 6S1c, of the positive storage voltage $V_{ST}$ to the first terminals 6T1, 6T3, and 6T5 of the input capacitors 6C1, 6C2, and 6C3 of these link circuits. Then in turn the appearance of a transfer pulse at the second terminal 6T6 of the input capacitor 6C3 of the third link circuit transfers the stored charge on this capacitor to the input capacitor 6C4 of the fourth link circuit, the appearance of a transfer pulse at the second terminal 6T4 of the input capacitor 6C2 of the second link circuit transfers the stored charge on this capacitor to the input capacitor 6C3 of the third link circuit, the appearance of a transfer pulse at the second terminal 6T2 of the input capacitor 6C1 of the first link circuit transfers the stored charge on this capacitor to the input capacitor 6C2 of the second link circuit, and so on. Thus the set "pattern" is continuously circulated around the closed chain as long as the transfer pulses are applied.

The circuit arrangement which has just been described with respect to its use as a pattern register or like information store possesses the interesting property that, if the input capacior of one link circuit is initially charged by the application of a positive storage voltage to its first terminal, and the input capacitor of another link circuit is initially charged by the application of a negative storage voltage to its first terminal, then with suitable gas-filled diodes and circuit constants the transfer pulses serve in effect to circulate the two stored charges in opposite directions around the closed chain. When the two charges pass each other, the stored charges are reduced, but the inherent regulating action of the circuit rebuilds them during rotation. The rate of circulation of the stored charge corresponding to the positive storage voltage is less than that of the stored charge of opposite sign. If, however, the circuit arrangement is modified to have only two pulse supply lines corresponding to, and connected similarly to, the pulse supply lines of the chain circuit previously described with reference to Fig. 4, then the two stored charges circulate in opposite directions at the same rate.

The specific form of pattern register or like information store which has been described with reference to Fig. 6 requires as many pulse supplies as there are link circuits.

A smaller number of pulse supplies can be used by grouping the link circuits, and connecting corresponding link circuits in the different groups to a common pulse supply line. In this case, however, the number of signal elements composing a pattern must be at least the number of groups less than the number of link circuits. A pattern register circuit arranged to register six-element signal patterns may for example comprise eight link circuits, the first, second, third, and fourth link circuits in the chain forming one group, and the remaining link circuits forming another group, and the second terminals of the input capacitors of the fourth and eighth link circuits being connected to a first common pulse supply line, the second terminals of the input capacitors of the third and seventh link circuits being connected to a second common pulse supply line, and so on.

Figure 7:
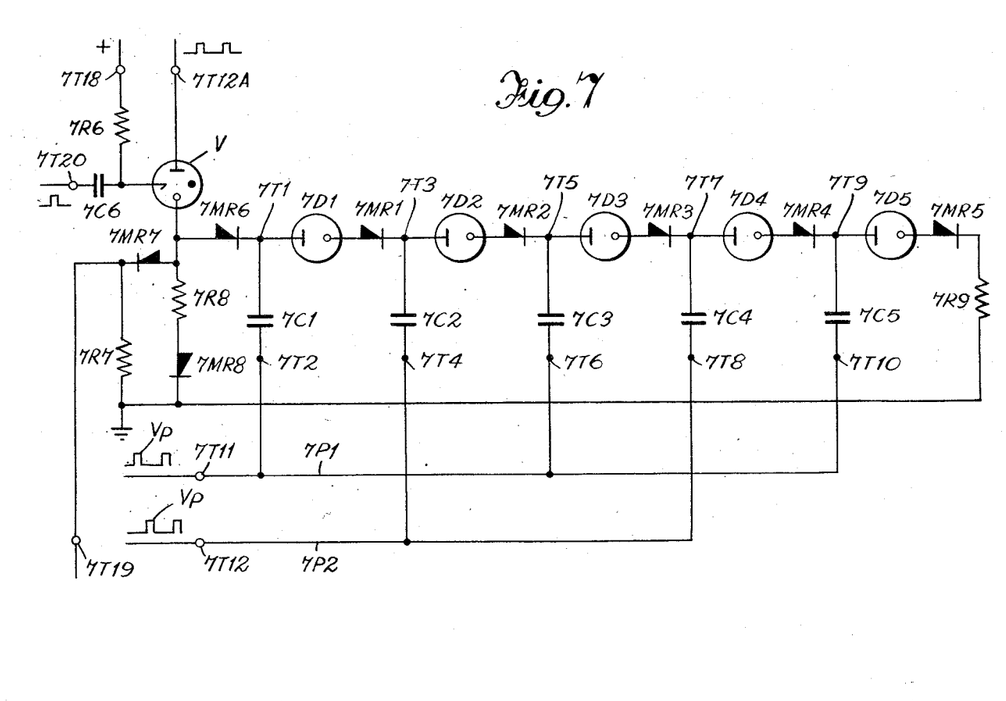

Reference has already been made to the circulation of two stored charges in opposite directions around a closed chain. Referring now to Fig. 7, this illustrates a chain circuit in which a plurality of link circuits are connected to form an unclosed chain arranged so that a positive charge, applied to the input capacitor of the first link circuit in the chain by an input stage, is transferred along the chain to a mis-matched termination at the other end of the chain, whereupon a negative charge, resulting from the mis-match, on the input capacitor of the last link circuit in the chain is transferred back along the chain to the input capacitor of the first link circuit, whereupon it is converted by the input stage to a positive charge and again transferred along the chain to the mis-matched termination, and so on. This chain circuit thus functions like a delay line. It is of the first of the two types which have been referred to, and has an odd number of link circuits. Each link circuit comprises an input capacitor 7C1, 7C2, 7C3, 7C4, or 7C5, a cold-cathode gas-filled diode 7D1, 7D2, 7D3, 7D4, or 7D5, and a rectifier 7MR1, 7MR2, 7MR3, 7MR4, or 7MR5. All the input capacitors have the same capacity, and all the gas-filled diodes have similar characteristics. With the exception of the last link circuit, the gas-filled diode and rectifier of each link circuit are connected in series between one terminal (hereinafter termed the first terminal) of the input capacitor of the link circuit and the first terminal of the input capacitor of the next succeeding link circuit of the chain, the diode being connected with its anode towards the first-mentioned terminal and the rectifier being connected with its positive terminal towards the second-mentioned terminal. In the figure, the so-called first terminals of the input capacitors of the link circuits are designated 7T1, 7T3, 7T5, 7T7, and 7T9, and the second terminals of these capacitors are designated 7T2, 7T4, 7T6, 7T8, and 7T10. The second terminals 7T2, 7T6, and 7T10 of the input capacitors 7C1, 7C3, and 7C5 of the odd-numbered link circuits are connected to a first pulse supply line 7P1, and the second terminals 7T4 and 7T8 of the remaining input capacitors 7C2 and 7C4 are connected to a second pulse supply line 7P2. The input stage includes a cold-cathode gas-filled triode V. The trigger electrode of the triode V is connected to an input circuit including a terminal 7T20 to which a positive pulse is applied to strike the triode when a marking condition is to be inserted into the chain. In addition to the terminal 7T20, this input circuit includes a capacitor 7C6, a resistor 7R6, and a terminal 7T18 which is connected to a source of a suitable steady positive biasing voltage. The anode of the triode is connected to a pulse supply terminal 7T12A which is either connected to the same source of positive pulses as the second pulse supply line 7P2 or is connected to a source of positive pulses which are in synchronism with the pulses supplied to the line 7P2. The cathode of the triode is connected to earth over a series circuit comprising a cathode resistor 7R8 and a cathode rectifier 7MR8 and is connected to the first terminal 7T1 of the input capacitor 7C1 of the first link circuit over an input rectifier 7MR6, both the cathode rectifier 7MR8 and the input rectifier 7MR6 being connected with their negative terminals towards the cathode. The gas-filled diode 7D5 and rectifier 7MR5 of the last link circuit and a terminating resistor 7R9 are connected in series between the first terminal 7T9 of the input capacitor 7C5 of the link circuit and earth, the diode being connected with its anode towards terminal 7T9 and the rectifier being connected with its negative terminal towards terminal 7T9. The common pulse supply lines 7P1 and 7P2 are connected, by way of pulse supply terminals 7T11 and 7T12 respectively, to pulse sources which are such that the potential of each pulse supply line is periodically raised from, and lowered to, earth to constitute a positive transfer pulse of the voltage $V_P$, the transfer pulses on one line lying in the intervals between the transfer pulses on the other. An output circuit comprises an output rectifier 7MR7, an output resistor 7R7, and an output terminal 7T19.

The operation of the chain circuit of Fig. 7 is as follows. When the triode V strikes as the result of the application of a positive pulse to terminal 7T20 (it should be noted that such striking can only take place during a positive pulse at terminal 7T12A and hence can only take place during a transfer pulse on the second pulse supply line 7P2), the input capacitor 7C1 of the first link circuit is given a positive charge, charging it to the voltage $V_{ST}$, by flow of charging current over the input rectifier 7MR6. The positive charge is transferred along the chain by the successive transfer pulses on the first and second pulse supply lines 7P1 and 7P2, and eventually reaches the input capacitor 7C5 of the last link circuit. The next transfer pulse on the first pulse supply line 7P1 brings about the striking of the gas-filled diode 7D5 of the last link circuit. Since there is no capacitor to accept the positive charge from the input capacitor of the last link circuit, upon the termination of the last-mentioned pulse this capacitor becomes negatively charged. The negative charge is then transferred back along the chain by the successive transfer pulses on the second and first pulse supply lines 7P2 and 7P1, and eventually reaches the input capacitor 7C1 of the first link circuit. The next positive pulse at terminal 7T12A (coinciding with the next transfer pulse on the second pulse supply line 7P2) brings about the striking of the triode V, owing to the fact that the cathode of this valve is now negative as a result of the negative charge on the input capacitor 7C1 of the first link circuit. This striking of the triode V again causes the input capacitor 7C1 of the first link circuit to be given a positive charge, and the whole process is repeated, and so on. It can be arranged that several marking conditions can be inserted into the chain, the marking conditions passing each other without affecting each other to a degree sufficient to interfere with the operation of the circuit. A pulse output can be derived from the output terminal 7T19 of the previously-mentioned output circuit.

Figure 8:
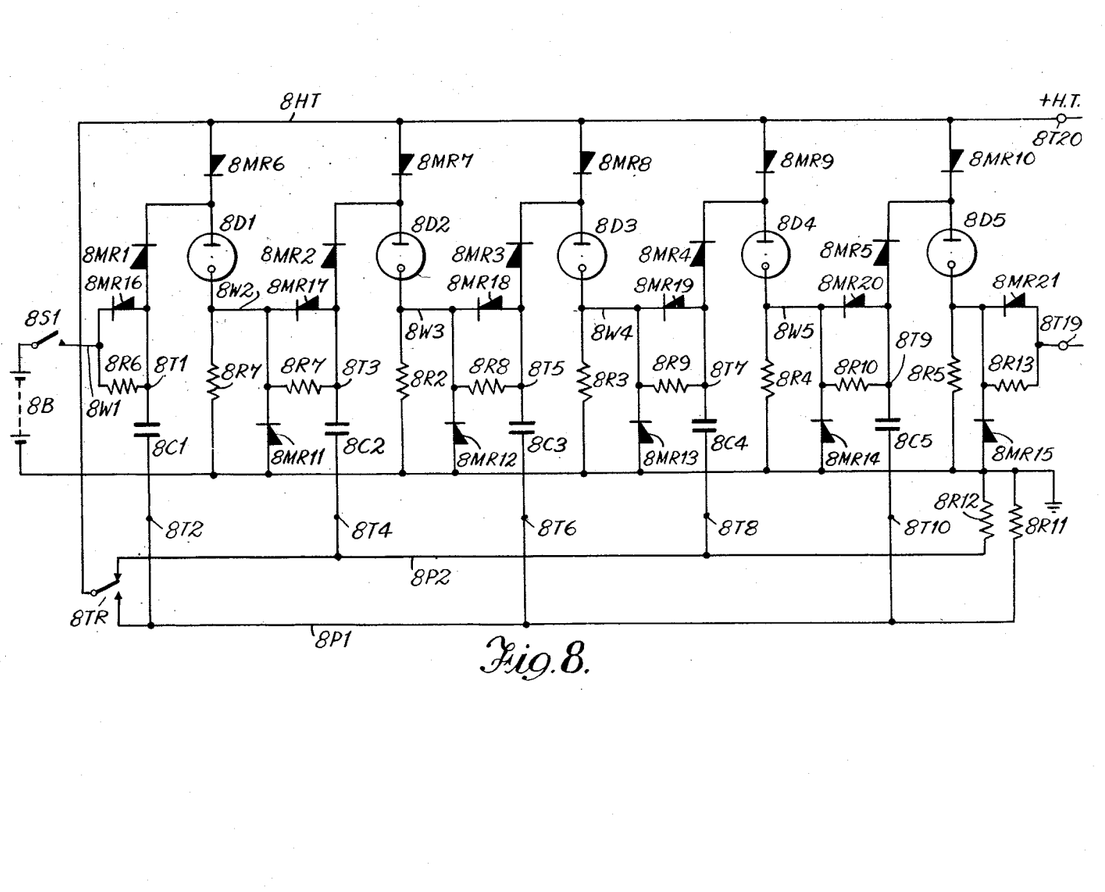
Fig. 8 is a circuit diagram illustrating a chain circuit which is of the second of the two types which have been referred to. In the chain circuit of Fig. 8, a plurality of link circuits are connected to form an unclosed chain arranged so that a marking condition is transferred along the chain in response to transfer pulses on two pulse lines.

Referring now to Fig. 8, this illustrates a chain circuit in which a plurality of link circuits are connected to form an unclosed chain arranged so that a marking condition is transferred from link circuit to link circuit along the chain in response to transfer pulses on two pulse lines. The chain circuit is of the second of the two types which have been referred to. Each link circuit comprises an input capacitor 8C1, 8C2, 8C3, 8C4, or 8C5, a cold-cathode gas-filled diode 8D1, 8D2, 8D3, 8D4, or 8D5, four rectifiers, and two resistors. Referring for a while to each link circuit, the first terminal 8T1, 8T3, 8T5, 8T7, or 8T9 of the input capacitor is connected over a first rectifier 8MR1, 8MR2, 8MR3, 8MR4, or 8MR5 to the anode of the gas-filled diode, the rectifier being connected with its positive terminal towards this anode. The anode of the gas-filled diode is connected over a second rectifier 8MR6, 8MR7, 8MR8, 8MR9, or 8MR10 to a high tension positive supply line 8HT, the rectifier being of course connected with its positive terminal towards the anode. The cathode of the gas-filled diode is connected to earth over a cathode resistor 8R1, 8R2, 8R3, 8R4, or 8R5 and a third rectifier 8MR11, 8MR12, 8MR13, 8MR14, or 8MR15 in parallel, the rectifier being connected with its positive terminal towards the cathode. The first terminal of the input capacitor is connected, over an input resistor 8R6, 8R7, 8R8, 8R9, or 8R10 and a fourth rectifier 8MR16, 8MR17, 8MR18, 8MR19, or 8MR20 in parallel, to an input wire 8W1, 8W2, 8W3, 8W4, or 8W5 of the link circuit, the fourth rectifier being connected with its positive terminal towards the input wire. The supply line 8HT is connected to the positive terminal of a suitable high tension source by way of a high tension positive supply terminal 8T20. Referring now to the chain circuit generally, the input wire 8W1, 8W2, 8W3, 8W4, or 8W5 of each link circuit other than the first is connected to the cathode of the gas-filled diode of the immediately preceding link circuit of the chain. The second terminals 8T2, 8T6, and 8T10 of the input capacitors 8C1, 8C3, and 8C5 of the odd-numbered link circuits are connected to a first pulse line 8P1, and the second terminals 8T4 and 8T8 of the remaining input capacitors 8C2 and 8C4 are connected to a second pulse line 8P2. Each pulse line is connected to earth over a control resistor 8R11 or 8R12. A changeover contact 8TR of a transfer relay (the winding of which is not shown) serves to connect the high tension positive supply line 8HT to the second pulse line 8P2 during periods in which the relay is unoperated, and to connect the high tension positive supply line 8HT to the first pulse line 8P1 during periods in which the relay is operated.

The operation of the chain circuit of Fig. 8 is as follows. The conditions just prior to the insertion of a marking into the chain after the chain circuit has been taken into use are that a high tension positive voltage $V_{HT}$, less than the striking voltage of the gas-filled diodes but greater than the maintaining voltage $V_M$ of these diodes, exists on the high tension positive supply line 8HT, and that none of the gas-filled diodes is in the conducting condition, and that the transfer relay is unoperated. Insertion of a marking is effected by the application of a positive input voltage of value $V_{HT}-V_M$ to the input wire 8W1 of the first link circuit in the chain. Upon such application, the input capacitor 8C1 of the first link circuit is charged, over the input resistor 8R6 of this link circuit, to the voltage $V_{HT}-V_M$, which state of charge of an input capacitor constitutes the marking condition. The means shown in the figure for this applying a positive input voltage of value $V_{HT}-V_M$ to the wire 8W1 is purely exemplary and comprises a "make" contact 8S1 and a battery 8B of the requisite voltage. As long as the input capacitor 8C1 of the first link circuit remains charged to the voltage $V_{HT}-V_M$, and the transfer relay remains unoperated, the first rectifier 8MR1 of the first link circuit is biased to its non-conducting condition and the gas-filled diode 8D1 of this link circuit remains in its non-conducting condition. Just prior to the operation of the transfer relay to bring about transfer of the marking condition from the first link circuit to the second link circuit in the chain, the input wire 8W1 of the first link circuit is disconnected from the source of the positive input voltage of value $V_{HT}-V_M$. Upon such operation of the transfer relay, the potential of the second terminal 8T2 of the input capacitor 8C1 of the first link circuit is raised to $V_{HT}$ volts positive. Consequently, the potential of the first terminal 8T1 of input capacitor 8C1 rises momentarily to $2V_{HT}-V_M$ volts positive, bringing the first rectifier 8MR1 of the first link circuit to its conducting condition and causing the gas-filled diode 8D1 of this link circuit to strike and discharge the charged input capacitor 8C1. During the discharge of this capacitor, the second rectifier 8MR6 of the first link circuit is biased to its non-conducting condition, but the discharge of the capacitor is quickly effected and the gas-filled diode 8D1 is then maintained in its conducting condition by current flow through this second rectifier. As a result of the striking of the gas-filled diode 8D1 of the first link circuit, the cathode of this diode assumes a potential of $V_{HT}-V_M$ volts positive, and consequently the input capacitor 8C2 of the second link circuit is charged, over the input resistor 8R7 of the second link circuit, to the voltage $V_{HT}-V_M$. Thus the operation of the transfer relay has brought about the transfer of the marking condition from the first link circuit to the second link circuit in the chain. It should be noted that pending further transfer the gas-filled diode 8D1 of the first link circuit remains in its conducting condition and maintains the charge on the input capacitor 8C2 of the second link circuit at the full value of $V_{HT}-V_M$ volts. Upon the subsequent release of the transfer relay, the potential of the second terminal 8T2 of the input capacitor 8C1 of the first link circuit is lowered to about earth, and the potential of the second terminal 8T4 of the input capacitor 8C2 of the second link circuit is raised to $V_{HT}$ volts positive. Consequently, the potential of the first terminal 8T3 of the input capacitor 8C2 of the second link circuit rises momentarily to $2V_{HT}-V_M$ volts positive, with the result, owing to the coupling provided by the fourth rectifier 8MR17 of the second link circuit, that the potential of the cathode of the gas-filled diode 8D1 of the first link circuit rises to about the same value so that this diode is extinguished. As will be clear from the description already given, another result of the rise of the potential of the first terminal 8T3 of the input capacitor 8C2 of the second link circuit to $2V_{HT}-V_M$ volts positive is that the gas-filled diode 8D2 of this link circuit strikes. Current flow through the fourth rectifier 8MR17 of the second link circuit quickly brings the first terminal 8T3 of the input capacitor 8C2 of this link circuit to about earth potential. The first rectifier 8MR2 of the second link circuit quickly becomes biased to its non-conducting condition, the gas-filled diode 8D2 of this link circuit being then maintained in its conducting condition by current flow through the second rectifier 8MR7 of this link circuit. As a result of the striking of the last-mentioned gas-filled diode, the input capacitor 8C3 of the third link circuit is charged to the voltage $V_{HT}-V_M$. Thus the release of the transfer relay has brought about transfer of the marking condition from the second link circuit to the third link circuit. Re-operation of the transfer relay brings about further transfer, and so on. The third rectifier 8MR11, 8MR12, 8MR13, 8MR14, or 8MR15 of each link circuit serves to prevent the cathode of the gas-filled diode of the link circuit from being driven negative when the potential of the second terminal of the input capacitor of the immediately succeeding link circuit is lowered, from $V_{HT}$ to about earth, by the operation or release (as the case may be) of the transfer relay. The chain circuit now being referred to is capable of maintaining the marking condition in alternate link circuits concurrently, and can therefore be used as a pattern register or like information store. An output can be derived from the cathode of the gas-filled diode 8D5 of the last link circuit in the chain. The figure shows a suitable output circuit comprising an output rectifier 8MR21, an output resistor 8R13, and an output terminal 8T19.

What I claim is:

1. A chain circuit, of the kind comprising a plurality of similar link circuits connected to form a closed chain, including a two-terminal trigger device in each link circuit, an input capacitor in each link circuit, said input capacitor being connected to one terminal of the two-terminal trigger device of the link circuit and to the other terminal of the two-terminal trigger device of the immediately preceding link circuit of the chain, means for establishing upon the input capacitor of a link circuit a charge constituting a marking condition of the link circuit, means for applying a transfer voltage to the chain for effecting transfer of the marking condition from a link circuit to an immediately adjacent link circuit of the chain, said transfer voltage on such application being effectively in series with the charged input capacitor of the first of the two link circuits and serving to bring about the triggering of the two-terminal trigger device of one of the two link circuits and the consequent flow through this trigger device of a current sufficing to bring the second of the two link circuits to the marking condition, and means for ensuring that transfer of the marking condition consequent on the application of a transfer voltage takes place in the desired direction along the chain.

2. A chain circuit as claimed in claim 1 in which said two-terminal trigger devices are cold-cathode gas-filled diodes.

3. A chain circuit, of the kind comprising a plurality of similar link circuits connected to form an unclosed chain, including a two-terminal trigger device in each link circuit, in each link circuit except the first in the chain an input capacitor connected to one terminal of the two-terminal trigger device of the link circuit and to the other terminal of the two-terminal trigger device of the immediately preceding link circuit of the chain, in the first link circuit in the chain an input capacitor connected to one terminal of the two-terminal trigger device of the link circuit, means for establishing upon the input capacitor of a link circuit a charge constituting a marking condition of the link circuit, means for applying a transfer voltage to the chain for effecting transfer of the marking condition from a link circuit to an immediately adjacent link circuit of the chain, said transfer voltage on such application being effectively in series with the charged input capacitor of the first of the two link circuits and serving to bring about the triggering of the two-terminal trigger device of one of the two link circuits and the consequent flow through this trigger device of a current sufficing to bring the second of the two link circuits to the marking condition, and means for ensuring that transfer of the marking condition consequent on the application of a transfer voltage takes place in the desired direction along the chain.

4. A chain circuit, of the kind comprising a plurality of similar link circuits connected to form a closed chain, including an input capacitor in each link circuit, a two-terminal trigger device and a rectifier in each link circuit, said two-terminal trigger device and said rectifier being connected in series between a first terminal of the input capacitor of the link circuit and the corresponding terminal of the input capacitor of the next succeeding link circuit of the chain, means for establishing upon the input capacitor of a link circuit a charge constituting a marking condition of the link circuit, means for applying a transfer voltage to the chain for effecting transfer of the marking condition from a link circuit to an immediately adjacent link circuit of the chain, said transfer voltage being for effecting such transfer applied to the second terminal of the input capacitor of one of the two link circuits and serving to bring about the triggering of the two-terminal trigger device of one of the two link circuits and the consequent flow through this trigger device of a current sufficing to bring the second of the two link circuits to the marking condition and said rectifiers serving to ensure that transfer of the marking condition consequent on the application of a transfer voltage takes place in the desired direction along the chain, and means for bringing the second terminal of the input capacitor of each link circuit to a datum potential during periods in which a transfer voltage is not applied to it.

5. A chain circuit as claimed in claim 4 comprising an even number of link circuits and including a common pulse supply line to which the second terminals of the input capacitors of odd-numbered link circuits are connected, and a further common pulse supply line to which the second terminals of the input capacitors of even-numbered link circuits are connected, each said common pulse supply line being a line the potential of which is periodically, for and during circulation of the marking condition around the closed chain, changed in one direction from and then restored to a datum potential to constitute the application, in the form of a transfer pulse, of a transfer voltage to the input capacitor terminals connected to the line, and the transfer pulses on each said common pulse supply line occurring in the intervals between the transfer pulses on the other.

6. A chain circuit as claimed in claim 4 comprising an even number of link circuits, and including a single common pulse supply line, the second terminal of the input capacitor of every other link circuit being connected to said common pulse supply line and the second terminals of the input capacitors of the remaining link circuits being connected to a point maintained at a datum potential, and said common pulse supply line being a line the potential of which is periodically, for and during circulation of the marking condition around the closed chain, firstly changed in one direction from and then restored to the datum potential to constitute the application, in the form of a transfer pulse of one sign, of a transfer voltage to the input capacitor terminals connected to the line and secondly changed in the other direction from and then restored to the datum potential to constitute the application, in the form of a transfer pulse of opposite sign, of a transfer voltage to the input capacitor terminals connected to the line.

7. A chain circuit as claimed in claim 4 including as many pulse supply lines as there are link circuits in the chain, the second terminals of the input capacitors of the link circuits being connected to different ones of said pulse supply lines, and each said pulse supply line being a line the potential of which is periodically, for and during circulation of the marking condition around the closed chain, changed in one direction from and then restored to a datum potential to constitute the application, in the form of a transfer pulse, of a transfer voltage to the input capacitor terminal connected to the line, and the transfer pulses on the different pulse supply lines being spaced so that transfer pulses are applied to the link circuits in turn taking the link circuits in order in one direction around the chain.

8. A chain circuit as claimed in claim 4 in which at least one of the link circuits includes a clamping rectifier connected between the first terminal of the input capacitor of the link circuit and a point maintained at a fixed potential.

9. A pattern register including a chain circuit as claimed in claim 4 and means for registering information on the chain by bringing to the marking condition a combination, corresponding to the information, of the link circuits of a set of link circuits of the chain.

10. A chain circuit, of the kind comprising a plurality of similar link circuits connected to form a closed chain, including an input capacitor in each link circuit, a two-terminal trigger device in each link circuit, said two-terminal trigger device being connected between a first terminal of the input capacitor of the link circuit and the corresponding terminal of the input capacitor of the next succeeding link circuit of the chain, means for establishing upon the input capacitor of a link circuit a charge constituting a marking condition of the link circuit, means for effecting transfer of the marking condition from a link circuit to an immediately adjacent link circuit of the chain comprising means for applying a transfer voltage to the second terminal of the input capacitor of one of this pair of link circuits and means for concurrently applying a transfer voltage to the second terminal of the input capacitor of a further link circuit immediately adjacent to one of this pair of link circuits, the first-mentioned application of a transfer voltage serving to bring about the triggering of the two-terminal trigger device of one of the said pair of link circuits and the consequent flow through this trigger device of a current sufficing to bring the second link circuit of the pair to the marking condition and the second-mentioned application of a transfer voltage serving to ensure that transfer of the marking condition takes place in the desired direction along the chain, and means for bringing the second terminal of the input capacitor of each link circuit to a datum potential during periods in which a transfer voltage is not applied to it.

11. A chain circuit, of the kind comprising a plurality of similar link circuits connected to form an unclosed chain, including an input capacitor in each link circuit, in each link circuit except the last in the chain a two-terminal trigger device and a rectifier connected in series between a first terminal of the input capacitor of the link circuit and the corresponding terminal of the input capacitor of the next succeeding link circuit of the chain, in the last link circuit in the chain a two-terminal trigger device and a mis-matched termination connected in series between a first terminal of the input capacitor of the link circuit and a point maintained at a datum potential, an input stage for establishing a charge of one sign upon the input capacitor of the first link circuit in the chain, and means for applying a transfer voltage, in the form of transfer pulses, to the second terminals of the input capacitors of the link circuits of the chain, said transfer pulses serving firstly for effecting transfer of said charge of one sign forwards along the chain to said mismatched termination whereupon said mis-matched termination serves for establishing a charge of opposite sign on the input capacitor of the last link circuit in the chain, and said transfer pulses serving secondly for effecting transfer of said charge of opposite sign backwards along the chain to the input capacitor of the first link circuit whereupon said input stage serves for again establishing a charge of said one sign upon this input capacitor for transfer forwards along the chain, and the transfer of a charge from the input capacitor of a link circuit to the input capacitor of an immediately adjacent link circuit of the chain taking place consequent on the application of a transfer pulse to the second terminal of the input capacitor of one of the two link circuits to bring about the triggering of the two-terminal trigger device of one of the two link circuits and the consequent flow through this trigger device of a current sufficing to apply the requisite charge to the input capacitor of the second of the two link circuits, and said rectifiers serving to ensure that transfer of a charge consequent on the application of a transfer pulse to the second terminal of the input capacitor of a link circuit takes place in the requisite direction along the chain.

12. A chain circuit, of the kind comprising a plurality of similar link circuits connected to form an unclosed chain, including a two-terminal trigger device in each link circuit, said two-terminal trigger device being connected in a series circuit to which is continuously applied a high tension voltage less than the triggering voltage of the device but greater than the voltage necessary to maintain the device in the triggered condition, a rectifier individual to each link circuit, an input circuit individual to each link circuit, in each link circuit except the first in the chain an input capacitor having a first terminal connected by way of said rectifier individual to the link circuit to one terminal of the two-terminal trigger device of the link circuit and further connected by way of said input circuit individual to the link circuit to the other terminal of the two-terminal trigger device of the immediately preceding link circuit of the chain, in the first link circuit in the chain an input capacitor having a first terminal connected by way of said rectifier individual to the link circuit to one terminal of the two-terminal trigger device of the link circuit, means for establishing upon the input capacitor of a link circuit a charge constituting a marking condition of the link circuit, and means for applying a transfer voltage to the chain for effecting transfer of the marking condition from a link circuit to the immediately succeeding link circuit of the chain, said transfer voltage being for effecting such transfer applied to the second terminal of the input capacitor of one of the two link circuits and serving to bring about the triggering of the two-terminal trigger device of the first of the two link circuits and the consequent flow through this trigger device of a current serving to bring the second of the two link circuits to the marking condition and the last-mentioned two-terminal trigger device being maintained in its triggered condition, pending further transfer of the marking condition, by said high tension voltage and whilst so maintained in its triggered condition serving to maintain the charge constituting the marking condition on the input capacitor of the second of the two link circuits and said application of a transfer voltage also serving, where the first of the two link circuits is not the first link circuit in the chain, to restore the two-terminal trigger device of the link circuit immediately preceding the first of the two link circuits to its normal untriggered condition.

No references cited.